(No Model.)
E. K. MEREDITH.
APPARATUS FOR FILTERING AND SEPARATING OIL FROM WATER.
No. 599,720. Patented Mar. 1, 1898.
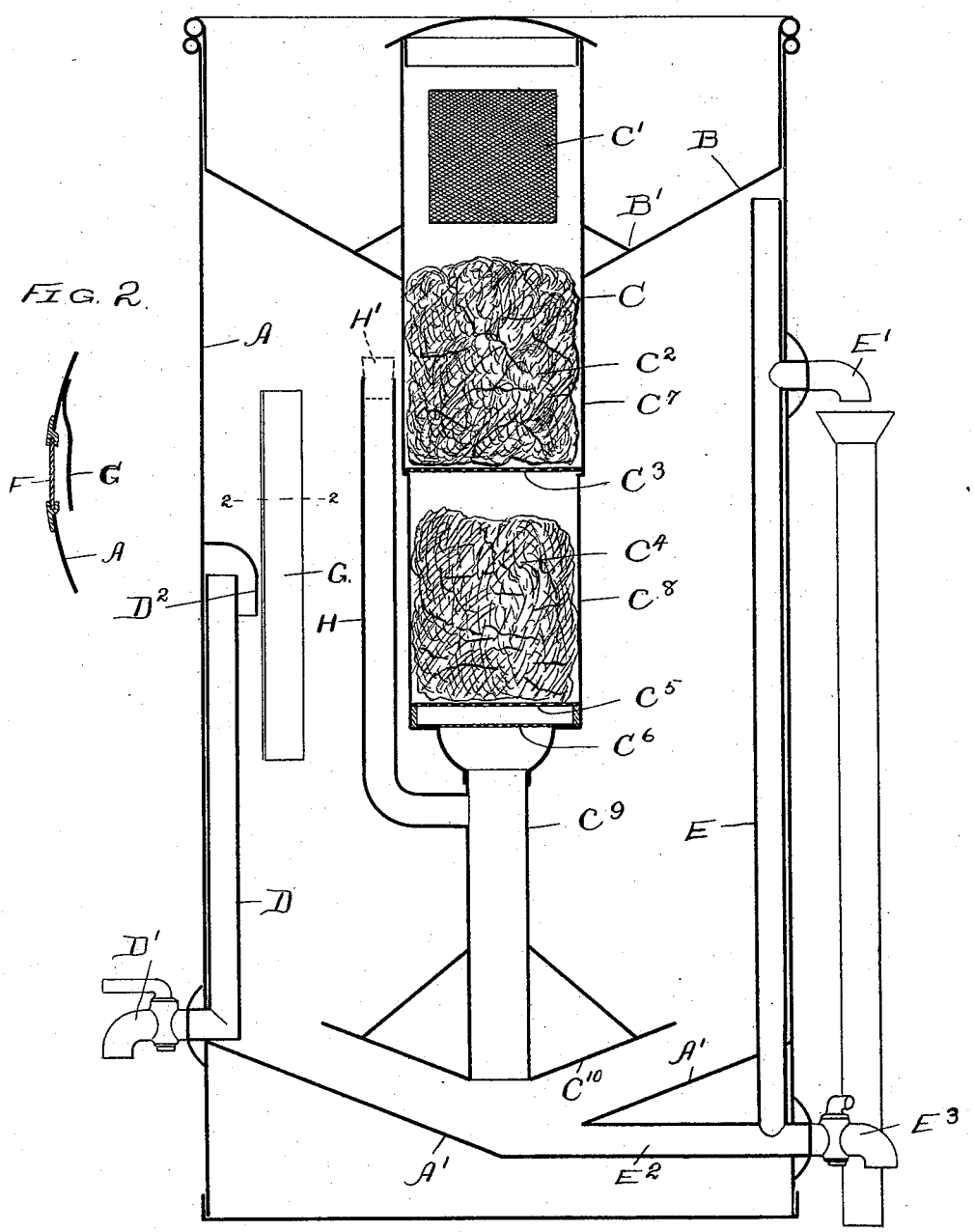
WITNESSES:
Sew. E. Curtis
H. W. Munday
INVENTOR:
EDWIN KEMP MEREDITH
BY Munday, Evarts & Adcock
HIS ATTORNEYS.

UNITED STATES PATENT OFFICE.

EDWIN KEMP MEREDITH, OF BATAVIA, ILLINOIS.

APPARATUS FOR FILTERING AND SEPARATING OIL FROM WATER.

SPECIFICATION forming part of Letters Patent No. 599,720, dated March 1, 1898.

Application filed March 29, 1897. Serial No. 629,639. (No model.)

*To all whom it may concern:*

Be it known that I, EDWIN KEMP MEREDITH, a citizen of the United States, residing in Batavia, in the county of Kane and State of Illinois, have invented a new and useful Improvement in Apparatus for Filtering and Separating Oil from Water, of which the following is a specification.

In the ordinary oil-filter the oil is passed down through a pipe to the bottom of a body of water, and as it issues from the pipe the oil by reason of its lighter specific gravity separates itself and rises through the body of water to the surface of the latter. Sometimes filtering mediums like screens, sponges, &c., are placed in the chamber containing the body of water or in the pipe by which the oil is admitted and in such position therein as to compel the oil to pass through them. Often the oil contains an admixture of water, and consequently the body of water is constantly augmented by the water so admitted; and to automatically prevent any surplus water in the apparatus, as well as to render it continuous in its operation so far as the water is concerned, and also to render it possible to continually or frequently add fresh water to that already in the apparatus, so that the water itself may be kept approximately pure and be thus better fitted to draw off the impurities from the oil, is the main object of my invention. The nature of the means employed to accomplish this result, as well as of other features of novelty attending the invention, is fully set forth in the description given below and illustrated in the accompanying drawings, in which—

Figure 1 is a vertical section of a filter constructed according to my invention, and Fig. 2 is a section of the same on the line 2 2 of Fig. 1.

In said drawings, A represents the body of the apparatus and is preferably in the form of an open-top vessel. Within this vessel and supported from its top is a receiver B, into which the oil is poured. The floor of the receiver is inclined so as to form an annular channel B' around the stand-pipe C, the upper end of which projects above said floor. The stand-pipe is provided with one or more openings in its side walls above the channel B', through which the oil enters from the receiver. These openings are guarded by vertical screens C', adapted to intercept the coarser impurities. I prefer to use vertical screens in this way, because to some extent such screens are self-cleaning, the impurities falling from them, as soon as the receiver is emptied of the oil, into channel B'. Said channel also collects and retains such of the heavier impurities as may settle through the oil while in the receiver. The receiver and stand-pipe are both removable, and therefore the channel is readily cleaned of its accumulations.

In the stand-pipe I prefer to place the filtering material at $C^2$, a screen at $C^3$ supporting the material $C^2$, other filtering material at $C^4$, and still other screens at $C^5$ and $C^6$, the former supporting the material $C^4$. The oil passes through all these purifying mediums in successive order in its descent through the pipe. I prefer also to make the pipe in two separate sections, $C^7$ and $C^8$ being one section and $C^9$ the other section, so that access can be had to all the purifying materials and screens for cleansing purposes when the pipe is taken out of the apparatus. The lower section may be of less diameter than the upper ones, as it contains no purifying agency. At the bottom of the stand-pipe and surrounding the opening at that end is a deflector $C^{10}$, the object of which is the prevention of any capillary action by the pipe upon the freshly-discharged oil therefrom. This deflector compels the oil to move some distance away from the pipe before it becomes free to rise by natural law, and it is thus compelled to submit itself more perfectly to the purifying action of the water and prevented from creeping up the pipe. The oil is discharged through the pipe D, having a regulating-valve D' at its lower end.

E is a vertical pipe having an outlet or discharge spout E', extending through the wall of the filter and located, preferably, above the plane at which the oil enters the pipe D. The floor A' of the filter slopes from the walls to the center, as plainly shown, in order to facilitate the assembling of the impurities at the center, and the pipe E is enabled to draw the water and floating impurities from this central point by means of the branch pipe $E^2$. The pipe E is always open, and whenever the water rises in it above the level of the spout E' an automatic discharge occurs. By this feature I obviate the presence in the filter of any excess water and enable the use of the apparatus in operating upon combined water and oil without any necessity on the part of the attendant of drawing off the accumulations of water, and it also enables the putting in of fresh water without requiring the drawing off by the attendant of the old water. In short, this feature enables the maintenance of a normal amount of water in the apparatus at all times automatically and regardless of the amount put in.

I carry the pipe E above the level of the pipe D, because the pressure of the body of oil upon the water will force the latter up in pipe E above the level of the main body of water in the filter. Of course it will not rise far enough to discharge until the body of oil acquires weight sufficient to force it to do so; but the variance in the water-line due to the variance in the pressure caused by the oil is readily permitted by the apparatus without affecting its operation. The oil should not, however, be permitted to become heavy enough to displace any except excess water.

In order that the operator may accurately know the amount of oil in the apparatus at all times, I provide it with newly-devised means for indicating the same which I believe are more reliable than those now used. A glass plate F is inserted in the wall of the filter and made sufficiently long to show the state of the oil at all times, and behind this glass and within the chamber a bright metallic or other reflector G of the same length as the glass is so arranged as to give the oil free access to the narrow space between the glass and the reflector—that is to say, said space is open not only at the bottom, but also along one of its vertical sides, in order that the oil may circulate in said space as freely as in any portion of the apparatus, so that, being thus unconfined, the oil in the space will truly represent the main body of the oil, and its depth and position in the apparatus. A faucet $E^3$ is used when the apparatus is to be wholly emptied.

Inasmuch as many of the impurities are too light to sink through the water, while yet too heavy to float upon the oil, and others are so light that they will not sink in the oil, it follows that two layers of impurities will form in the continued use of the apparatus, one at the top of the water and the other at the top of the oil. It is not desirable that the incoming oil be compelled to force its way through the layer at the top of the water, which I have known to become two inches or more thick when the apparatus does not receive proper care or cleansing, and to avoid this as far as possible I employ a vertical pipe H, leading from the stand-pipe at some point below the screens and filters, through which the oil may rise without passing through the accumulation of impurities on top of the water. I prefer to extend this pipe to the level of the spout E' or a trifle above it. Of course the oil which is diverted by this pipe does not pass to the bottom of the stand-pipe nor receive the filtering action of the body of water in the filter; but it will have passed through all the screens and filters in the stand-pipe and be comparatively pure and will also have avoided contact with the accumulated impurities held by the water. It may be closed at the top by the stopper H' at any time if it is not desired to use it.

To avoid drawing off the scum and impurities on the top of the oil, I place over the top of pipe D a cap $D^2$, the lower edge of which is below the top of the pipe, so that the oil in order to gain entrance to the pipe must first pass under the cap. This acts to stimulate the movement of the oil through the pipe, while it also detains the scum. The discharge of the oil is also stimulated by the head of oil in the pipe D and of that above said pipe, and it is for this purpose that I employ said pipe in connection with the cock D'.

I claim—

1. The combined filter and separator, consisting of the vessel A, a filtering stand-pipe extending nearly to the bottom of the vessel, a constantly-open overflow for the water, and an outlet for the oil, substantially as specified.

2. The indicator or gage for filters &c., consisting of a glass plate adapted to be inserted in the wall of the filter, and a reflector G, supported behind said plate and at a short distance therefrom, the space between the two being open along one vertical side, substantially as specified.

3. In an oil-filter, the combination with the stand-pipe of the oil-pipe H, operating substantially as set forth.

4. The oil-filter comprising in combination a main vessel adapted to hold a body of water and a body of oil, a pipe or passage extending to the bottom of the water and through which the oil and water are poured into the filter, and a pipe H for diverting the oil from said pipe or passage, and giving it exit to the top of said body of oil without its passing through the body of water, substantially as specified.

5. The combination in an oil-filter of an oil-discharge pipe and a cap $D^2$ placed over and extending below the level of the inlet end of the pipe and acting to prevent the scum upon the surface of the oil from entering the pipe, substantially as specified.

EDWIN KEMP MEREDITH.

Witnesses:
H. M. MUNDAY,
L. E. CURTIS.